United States Patent
Stahl et al.

(10) Patent No.: US 10,025,918 B2
(45) Date of Patent: Jul. 17, 2018

(54) APPARATUS AND METHOD FOR PASSWORD AUTHENTICATION

(71) Applicant: THOMSON LICENSING, Issy de Moulineaux (FR)

(72) Inventors: Niclas Stahl, Sartrouville (FR); Marc Joye, Fougeres (FR)

(73) Assignee: Thomson Licensing, Issy-les-Moulineaux (FR)

( * ) Notice: Subject to any disclaimer, the term of this patent is extended or adjusted under 35 U.S.C. 154(b) by 23 days.

(21) Appl. No.: 14/736,601

(22) Filed: Jun. 11, 2015

(65) Prior Publication Data
US 2015/0363588 A1    Dec. 17, 2015

(30) Foreign Application Priority Data
Jun. 12, 2014  (EP) ..................... 14305883

(51) Int. Cl.
*H04L 29/06*    (2006.01)
*G06F 21/34*    (2013.01)
(Continued)

(52) U.S. Cl.
CPC .............. *G06F 21/34* (2013.01); *G06F 21/46* (2013.01); *H04L 63/0428* (2013.01); *H04L 63/083* (2013.01); *H04L 63/0853* (2013.01)

(58) Field of Classification Search
None
See application file for complete search history.

(56) References Cited

U.S. PATENT DOCUMENTS

| 5,226,080 | A | * | 7/1993 | Cole | .................. G07C 9/00142 235/382 |
| 6,064,736 | A | * | 5/2000 | Davis | ...................... G06F 21/31 380/30 |

(Continued)

FOREIGN PATENT DOCUMENTS

| JP | 2005208763 | 1/2004 |
| JP | 2007114976 | 5/2007 |

(Continued)

OTHER PUBLICATIONS

Bard—"Spelling-Error Tolerant, Order-Independent Pass-Phrases via the Damerau-Levenshtein String-Edit Distance Metric"—International Association for Cryptologic Research, vol. 20061103:161300, pp. 1-8, Oct. 20, 2006.

(Continued)

*Primary Examiner* — Eric Chen
(74) *Attorney, Agent, or Firm* — Myers Wolin LLC

(57) ABSTRACT

A user inputs a password at a user device whose processor receives the password, retrieves a stored derived value resulting from a derivation function, preferably a cryptographic one-way function, applied to a reference password, scrambles the received password using a function taking the derived value as a variable to obtain a scrambled password, and sends the scrambled password to an authentication server. In case the stored derived value cannot be retrieved, the processor uses the derivation function to generate a derived value from the received password. In case the password is received during generation of a new password, the processor generates and stores a derived value from the new password. In an embodiment, the apparatus comprises the authentication server.

7 Claims, 3 Drawing Sheets

(51) Int. Cl.
*G06F 21/46* (2013.01)
*G06F 7/04* (2006.01)
*G06F 15/16* (2006.01)
*G06F 17/30* (2006.01)

(56) References Cited

U.S. PATENT DOCUMENTS

| | | | |
|---|---|---|---|
| 6,539,479 B1 | 3/2003 | Wu | |
| 7,373,516 B2 | 5/2008 | Ashok et al. | |
| 8,140,855 B2 | 3/2012 | Zhu et al. | |
| 8,254,571 B1* | 8/2012 | Boyen | H04L 9/0863 380/252 |
| 8,453,207 B1 | 5/2013 | White et al. | |
| 8,832,804 B1* | 9/2014 | Casey | G06F 21/31 704/273 |
| 9,213,812 B1* | 12/2015 | Windell | G06F 21/31 |
| 2003/0061519 A1 | 3/2003 | Shibata et al. | |
| 2003/0154446 A1* | 8/2003 | Constant | H04L 12/5895 715/256 |
| 2006/0156026 A1* | 7/2006 | Utin | G06F 21/31 713/183 |
| 2008/0235772 A1 | 9/2008 | Janzen | |
| 2009/0126018 A1* | 5/2009 | Keohane | G06F 21/46 726/23 |
| 2011/0087890 A1* | 4/2011 | Munsil | G06F 21/31 713/184 |
| 2013/0125221 A1 | 5/2013 | Agrawal et al. | |
| 2013/0254875 A1 | 9/2013 | Sama | |
| 2014/0032922 A1* | 1/2014 | Spilman | G06F 21/602 713/184 |
| 2014/0096210 A1* | 4/2014 | Dabbiere | H04L 63/0861 726/5 |
| 2015/0172272 A1* | 6/2015 | Levner | H04L 63/083 726/7 |

FOREIGN PATENT DOCUMENTS

| | | |
|---|---|---|
| KR | 2003093605 | 12/2003 |
| WO | WO0195545 | 12/2001 |
| WO | WO2006/048043 | 5/2006 |
| WO | WO2012159191 | 11/2012 |

OTHER PUBLICATIONS

Shay et al: "Correct horse battery staple: Exploring the usability of system-assigned passphrases"—Symposium on Usable Privacy and Security (SOUPS) 2012, Jul. 11-13, 2012,pp. 1-20.
Salt (cryptography)—Wikipedia, the free encyclopedia_Oct. 10, 2014.
Search Report dated Aug. 29, 2014.

* cited by examiner

APPARATUS AND METHOD FOR PASSWORD AUTHENTICATION

This application claims the benefit, under 35 U.S.C. § 119 of European Patent Application No. 14305883.2, filed Jun. 12, 2014.

TECHNICAL FIELD

The present disclosure relates generally to computer systems and in particular to the treatment of passwords in such systems.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Passwords are ubiquitous in today's computer systems, for example to authenticate a user for log-on. In its generic definition, a password is constituted of a succession of symbols taken within a predefined alphabet (for example: 4 numerical values for PIN code). A password is generally stronger the longer it is, in particular if the password is a mixture of uppercase and lowercase letters, numbers, and characters such as &, " and #. However, a more complicated password is generally more complicated to type properly, especially since the typed characters do not appear on the screen. In addition, since users may be obliged to input the passwords many times a day, the passwords are often typed very quickly. It is thus not surprising that an input password can contain typing errors. Moreover touchscreen-based devices like smartphones and tablets use virtual keyboards to enter some text, including passwords. With this type of input, typing errors can be quite frequent.

The prior art comprises a number of solutions that provide passwords that are resistant to typing errors.

The tool Password Variator builds a file with all possible variations on the password, emulating up to three typos such as missed characters, duplicated characters, extra characters, wrong order and wrong case. Andrew Mehler and Steven Skiena provide a different solution in Improving Usability Through Password-Corrective Hashing. Their solution processes the password before hashing—for example by sorting the input password alphabetically to correct transpositions—so that it is likely that a slightly misspelt password hashes to the same hash value as the correct password. It is evident that such multiplication of "acceptable" passwords drastically reduces the strength of the password since many different passwords hash to the same value, including passwords that differ from much more than one or two typos.

The solutions in U.S. Pat. No. 7,373,516 and JP 2005-208763 compare an input password with a stored password in the "password space," i.e. in the clear, to determine if the former is "similar" to the latter. However, since these solutions require a comparison of the plaintext versions of the password, they cannot be used in real systems where storing the password in clear is generally unacceptable for obvious security reasons. Generally, authentication is handled by a server that stores a hashed version of the password, to be compared with a hashed version of the password proposal typed by the user. This is to make stealing of the passwords file less valuable.

JP 2007-114976 teaches a device, such as a PC, that among other things provides the function of keeping a count of the number of times a mistyped password is input and storing a mistyped password as an acceptable password when the number of times is sufficiently large, e.g. ten times. The skilled person will appreciate that the solution is insecure since there does not appear to be any control of the addition of the mistyped passwords; when a wrong password has been input ten times, it is stored as an acceptable password, which means that a hacker only needs to input a password ten times to have it accepted.

It can therefore be appreciated that there is a need for a solution that can allow an authentication system to allow mistyped passwords without having the drawbacks of the prior art solutions. The present disclosure provides such a solution.

SUMMARY OF DISCLOSURE

In a first aspect, the disclosure is directed to an apparatus for processing a password configured to: receive the password; retrieve a stored derived value generated by a derivation function applied to a reference password; scramble the password using a scrambling function taking the derived value as a variable to obtain a scrambled password; and send the scrambled password to an authentication server.

In a first embodiment, the apparatus is further configured to use the derivation function to generate a derived value from the received password in case the stored derived value cannot be retrieved.

In a second embodiment, the apparatus is further configured, in case the password is received during generation of a new password, to use the derivation function to generate a derived value from the new password and to store the derived value thus generated.

In a third embodiment, the apparatus comprises the authentication server.

In a fourth embodiment, the derivation function is a cryptographic one-way function.

In a second aspect, the disclosure is directed to a method for processing a password proposal by: receiving the password; retrieving a stored derived value generated by a derivation function applied to a reference password; scrambling the password using a scrambling function taking the derived value as a variable to obtain a scrambled password; and sending the scrambled password to an authentication server.

In a first embodiment, the derivation function is used to generate a derived value from the received password in case the stored derived value cannot be retrieved.

In a second embodiment, in case the password is received during generation of a new password, a derived value is generated, using the derivation function, from the new password and then stored.

In a third embodiment, the derivation function is a cryptographic one-way function.

In a third aspect, the disclosure is directed to a non-transitory computer program support storing instructions that, when executed by a processor, performs the method of any embodiment of the second aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

The disclosure relates particularly to treatment of passwords, which will be used herein as a non-limitative example. It should however be understood that other kinds of data may be used instead of passwords.

A general idea is to generate a derived value from a reference password using a derivation function that, to enhance security, is a cryptographic one-way function such as a (keyed) hash function or a symmetric or asymmetric encryption function.

The derived value is then used to process the password. In a particularly advantageous embodiment, the password is processed using a "resistance function" that takes the derived value as a variable and scrambles the input password in such a way that, when compared to a reference password value, differences in particular characters between the scrambled password and the reference password can be detected. In other words, it is possible to determine if there are typing errors in the input password; how many errors can be detected depends on the detection method.

A first example of a detection method is to take a password P comprising n characters $p_1$-$p_n$ and generate n HMAC values using the derived value as a key, wherein HMAC value j, for j in $\{1, \ldots, n\}$, is generated from $p_1$-$p_n$ less $p_j$. The n HMAC values are then sent to an authentication server that stores a number of HMACs generated the same way from a reference password. If at least one HMAC for the input password matches at least one HMAC for the reference password, then the input password is considered correct. This method can be generalized to allow any number (up to n) typing errors in the password.

A second example of a detection method is to take a password P comprising n characters $p_1$-$p_n$ and use the derived value as respective keys in a shuffling algorithm and in a character substitution cipher. The resulting value is sent to the authentication server that compares it with a 'scrambled' reference password generated using the same way from an input reference password to determine if the input password is correct. The number of typing errors that is accepted can be set beforehand without needing to modify the scrambling method.

Figure 1:
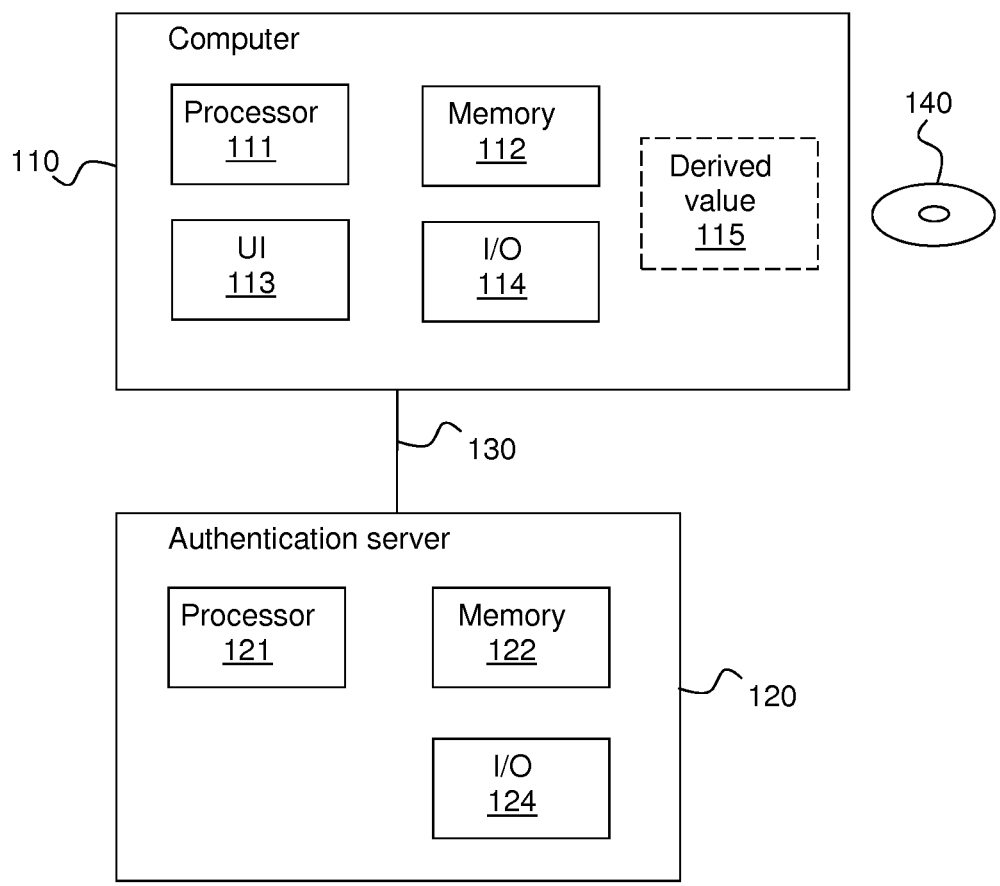
FIG. 1 illustrates an exemplary system in which the disclosure may be implemented.

FIG. 1 illustrates an exemplary system in which the disclosure may be implemented. The system comprises a computing device ("computer") 110 and an authentication server 120. The computer 110 and the authentication server (hereinafter "server") 120 can be any kind of suitable computer or device capable of performing calculations, such as a standard Personal Computer (PC) or workstation. The computer 110 and the server 120 each preferably comprise at least one processor 111, 121, internal or external RAM memory 112, 122, a user interface 113 for interacting with a user, and a second interface 114, 124 for interaction with other devices over connection 130. The computer 110 and the server 120 each also preferably comprise an interface for reading a software program from a digital data support 140 that stores instructions that, when executed by a processor, performs any of the password methods described hereinafter. The skilled person will appreciate that the illustrated devices are very simplified for reasons of clarity and that real devices in addition would comprise features such as persistent storage. The skilled person will appreciate that the present disclosure may also be implemented on just the computer 110 if the password just provides access to the computer itself; in this case, the server 120 is implemented in the computer.

The computer 110 further comprises a unit 115 for accessing the derived value. The derived value may be stored in an internal memory of the computer 110 in which case the unit 115 may be implemented in the processor 111 by a simple read instruction. The derived value may also be stored in a unit (not shown) such as a smartcard, in which case the unit 115 may be implemented in the processor and a smartcard interface so that the derived value can be read.

The processor 111 is configured to process the password, input by a user or received from a further device on which the user input the password, to obtain a scrambled password as described herein. In case the unit 115 can access the derived value, then this derived value is used to obtain the scrambled password. On the other hand, in case the unit 115 cannot access the derived value—this may for example happen if the smartcard is not present—then the processor 111 first generates the derived value from the input password before using the generated derived value to scramble the password.

It will be appreciated that since a stored derived value was stored upon entry of a password without typing errors, it is a correct derived value—this is for example the case if the stored derived value was generated and stored during creation of the password. In this case, typing errors in the input password can be corrected. However, in case the derived value is generated from the input password, then the derived value will be incorrect if the input password is incorrect, which means that the scrambled password in all probability will be incorrect and the typing errors will not be corrected. This means that typing errors can be corrected if the derived value can be retrieved (such as if the smartcard is present), while the password has to be 100% correct in case the derived value cannot be accessed.

Figure 2:
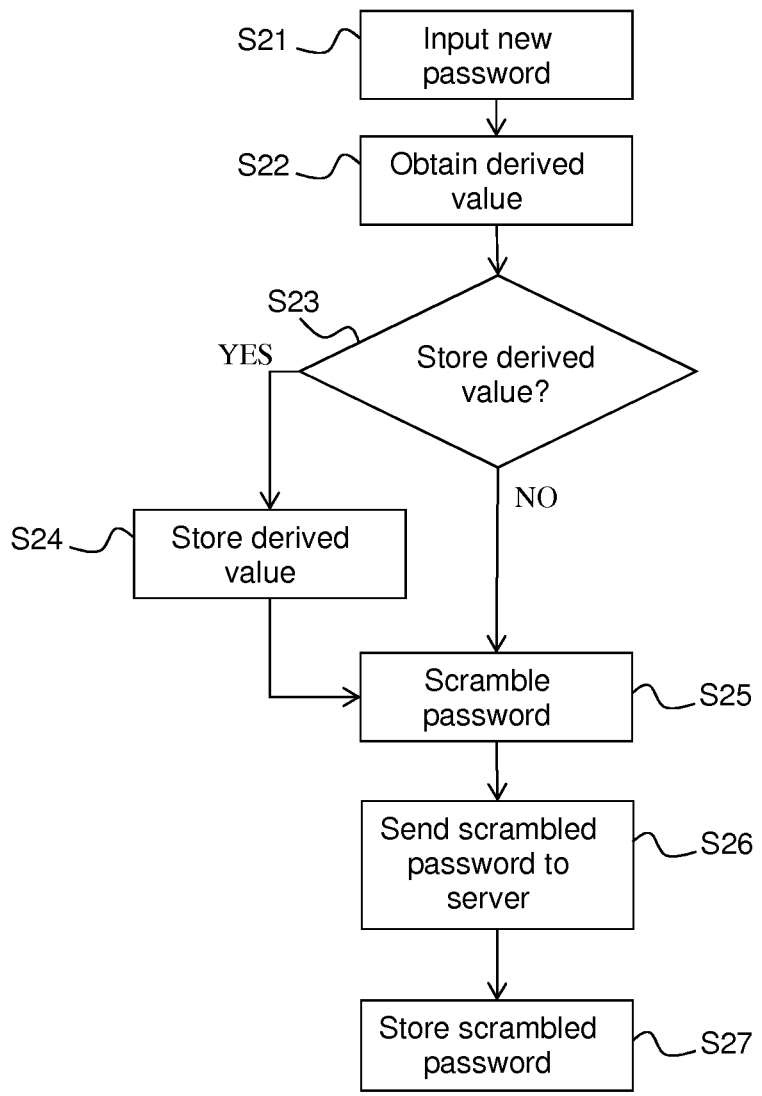
FIG. 2 illustrates an exemplary method of password generation according to a preferred embodiment.

FIG. 2 illustrates an exemplary method of password generation according to a preferred embodiment. Only the password is used in the example, while a corresponding user name would be used in at least some implementations.

In a first step, the user inputs, S21, a new password using the user interface 113 of the computer 110, which then uses, S22, the derivation function on the new password to obtain a derived value as described.

The computer checks, S23, if it can—and preferably if it is along the user's wishes—store the derived value. This may for example not be possible if the smartcard, in that embodiment, is not present. The computer stores, S24, the derived value if possible; otherwise it does not.

The computer then uses, S25, the resistance function with the derived value on the proposal to obtain a scrambled new password, which is sent, S26, to the server 120 for storage. The skilled person will appreciate that it is possible, even preferable, to use so-called salts and encryption/authentication—such as the Secure Authenticated Channel (SAC) described in WO 2006/048043—to protect the scrambled new password further during the transfer to the server 120, but this will not be described as it is well known to the skilled person and beyond the scope of the present disclosure.

The server 120 receives the scrambled new password and stores it, S27, as a scrambled reference password for future use.

Figure 3:
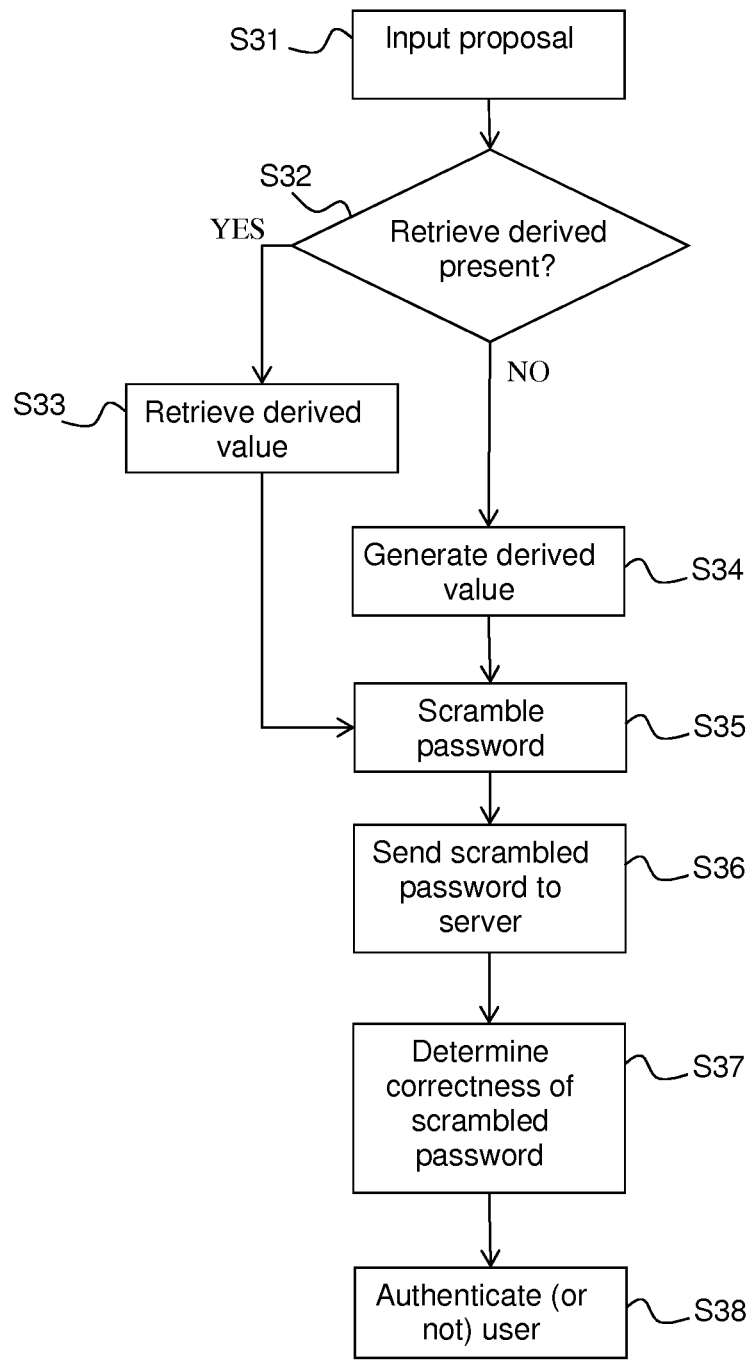
FIG. 3 illustrates an exemplary method of password authentication according to a preferred embodiment.

FIG. 3 illustrates an exemplary method of password authentication according to a preferred embodiment. Like in FIG. 2, only the password is used in the example.

In a first step, the user inputs, S31, a password proposal P (hereafter named proposal) using the user interface 113 of the computer 110. The computer checks, S32, if it can access the derived value. This may for example not be possible if the smartcard, in that embodiment, is not present. The computer retrieves, S33, the derived value if possible; otherwise it uses the derivation function, S34, on the proposal to obtain a derived value as described.

The computer then uses, S35, the resistance function with the derived value on the proposal to obtain a scrambled proposal, which is sent, S36, to the server 120 for authentication. The skilled person will appreciate that, like in FIG. 2, it is possible, even preferable, to protect the proposal further during the transfer to the server 120.

The server 120 receives the scrambled proposal and compares the scrambled proposal and the scrambled reference password to determine, S37, the correctness of the proposal according to the implemented detection method. In this case, the server authenticates, S38, the user and outputs a notification to this effect. Otherwise the user is not authorized (i.e. not authenticated) and is preferably notified of this and it is possible that the user may be offered a new attempt to input a proposal.

It will be appreciated that FIGS. 2 and 3 for simplicity use the singular for "scrambled new password" and "reference password", but there may also be a plurality of these if for instance the first detection method is used.

It will be appreciated that the present disclosure can provide password system that is resistant to typing errors provided that the derived value is present.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. An apparatus, comprising processor circuitry, for authenticating a password proposal, the apparatus being configured to:
   receive the password proposal;
   retrieve a stored derived value generated by a derivation one-way hash function applied to a correct password or, if the stored derived value cannot be retrieved, apply the derivation one-way hash function to the password proposal to generate a derived value;
   scramble the password proposal using a scrambling function taking the stored derived value or the derived value as a variable to obtain a scrambled password, the scrambled password representing at least one acceptable password when the stored derived value or the derived value has been generated by applying the derivation one-way hash function to the correct password or a correct password proposal; and
   send the scrambled password to an authentication server, wherein the scrambled password enables detection of difference in particular characters between the password proposal and the correct password,
   wherein the scrambled password generated from the derived value is successfully authenticated upon exact match with a correct scrambled password while the scrambled password generated from the stored derived value is successfully authenticated when it matches one of a plurality of acceptable scrambled passwords generated to correct a mistyped password.

2. The apparatus of claim 1, wherein, in case the password is received during generation of a new password, the hardware processor is further configured to use the derivation function to generate a derived value from the new password and to store the derived value thus generated.

3. The apparatus of claim 1, further comprising the authentication server.

4. The apparatus of claim 1, wherein the variable is used as a key of the scrambling function.

5. A method for authenticating a password proposal, the method comprising at processor circuitry of a user device:
   receiving the password proposal;
   retrieving a stored derived value generated by a derivation one-way hash function applied to a correct password or, if the stored derived value cannot be retrieved, apply the derivation one-way hash function to the password proposal to generate a derived value;
   scrambling the password proposal using a scrambling function taking the stored derived value or the derived value as a variable to obtain a scrambled password, the scrambled password representing at least one acceptable password when the stored derived value or the derived value has been generated by applying the derivation one-way hash function to the correct password or a correct password proposal; and
   sending the scrambled password to an authentication server, wherein the scrambled password enables detection of difference in particular characters between the password proposal and the correct password,
   wherein the scrambled password generated from the derived value is successfully authenticated upon exact match with a correct scrambled password while the scrambled password generated from the stored derived value is successfully authenticated when it matches one of a plurality of acceptable scrambled passwords generated to correct a mistyped password.

6. A non-transitory computer readable medium comprising a computer program product which comprises program code instructions executable by a processor for implementing the steps of a method according to claim 5.

7. The method of claim 5, wherein the variable is used as a key of the scrambling function.

* * * * *